(12) United States Patent
Puigardeu Aramendia et al.

(10) Patent No.: US 11,390,032 B2
(45) Date of Patent: Jul. 19, 2022

(54) CONSERVING ENERGY FOR EMPTY 3D PRINTING LAYERS

(71) Applicant: HEWLETT-PACKARD DEVELOPMENT COMPANY, L.P., Houston, TX (US)

(72) Inventors: Sergio Puigardeu Aramendia, Sant Cugat del Valles (ES); Pablo Dominguez Pastor, Sant Cugat del Valles (ES); Sebastia Cortes Herms, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 383 days.

(21) Appl. No.: 16/097,262

(22) PCT Filed: Jul. 21, 2016

(86) PCT No.: PCT/US2016/043342
§ 371 (c)(1),
(2) Date: Oct. 28, 2018

(87) PCT Pub. No.: WO2018/017099
PCT Pub. Date: Jan. 25, 2018

(65) Prior Publication Data
US 2019/0111629 A1 Apr. 18, 2019

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/165* (2017.08); *B29C 64/20* (2017.08);
(Continued)

(58) Field of Classification Search
CPC .................................................. B29C 64/165
See application file for complete search history.

(56) References Cited

U.S. PATENT DOCUMENTS 7,296,990 B2 11/2007 Devos et al.
7,306,758 B2 * 12/2007 Nielsen .................. B29C 64/40
264/308

(Continued)

FOREIGN PATENT DOCUMENTS

CN 103009631 4/2013
EP 1486318 A2 12/2004

(Continued)

OTHER PUBLICATIONS

International Search Report and Written Opinion for International Application No. PCT/US2016/043342, dated Mar. 30, 2017, 7 pages.

*Primary Examiner* — Niki Bakhtiari
*Assistant Examiner* — Nicholas J Chidiac
(74) *Attorney, Agent, or Firm* — HP Inc. Patent Department

(57) ABSTRACT

According to one aspect there is provided a three-dimensional printer. The printer comprises a controller to obtain data relating to a layer of a build model, to process non-empty layers according to a first operating mode and to process empty layers according to a second operating mode.

9 Claims, 7 Drawing Sheets

(51) Int. Cl.
  *B29C 64/165* (2017.01)
  *B33Y 50/00* (2015.01)
  *B33Y 10/00* (2015.01)
  *B33Y 50/02* (2015.01)
  *B29C 64/20* (2017.01)
  *B33Y 70/00* (2020.01)
  *B29C 64/124* (2017.01)

(52) U.S. Cl.
  CPC .............. *B33Y 10/00* (2014.12); *B33Y 30/00* (2014.12); *B33Y 50/00* (2014.12); *B33Y 50/02* (2014.12); *B33Y 70/00* (2014.12); *B29C 64/124* (2017.08)

(56) References Cited

U.S. PATENT DOCUMENTS

| | | | |
|---|---|---|---|
| 2001/0045678 A1* | 11/2001 | Kubo | B29C 64/35 264/37.29 |
| 2004/0178531 A1* | 9/2004 | Nielsen | B33Y 50/02 264/40.1 |
| 2009/0051977 A1 | 2/2009 | Moody | |
| 2012/0133080 A1 | 5/2012 | Moussa et al. | |
| 2015/0066178 A1 | 3/2015 | Stava | |
| 2015/0251351 A1 | 9/2015 | Feygin | |
| 2015/0258736 A1 | 9/2015 | Chen et al. | |
| 2015/0266238 A1 | 9/2015 | Ederer et al. | |
| 2016/0052212 A1 | 2/2016 | Schmidt | |
| 2017/0326789 A1* | 11/2017 | Kimblad | B29C 64/153 |

FOREIGN PATENT DOCUMENTS

| | | |
|---|---|---|
| GB | 2532470 A | 5/2016 |
| JP | 2011037079 | 2/2011 |
| KR | 1020170088902 | 8/2017 |
| WO | WO-2014092651 A1 | 6/2014 |
| WO | WO-2016010590 A1 | 1/2016 |
| WO | WO 2016079193 | 5/2016 |

* cited by examiner

CONSERVING ENERGY FOR EMPTY 3D PRINTING LAYERS

BACKGROUND

Additive manufacturing systems, typically referred to as 3D printing systems, are generally useful in generating low quantities of certain types of objects. To help the transition of such systems into high productivity environments such systems have to be able to generate objects in an efficient manner.

BRIEF DESCRIPTION

Examples will now be described, by way of non-limiting example only, with reference to the accompanying drawings, in which.

DETAILED DESCRIPTION

Some 3D printing system generate three-dimensional objects by forming successive layers of a build material, such as a powdered build material, onto a build platform, and selectively solidifying, through an appropriate mechanism, portions of each layer to form an object layer by layer.

One such 3D printing technique forms a layer of a powdered build material on a build platform and pre-heats the layer of build material to close to its melting point. Then, a fusing agent may be selectively printed on the formed layer of build material in a pattern derived from a 3D model of an object to be generated. Fusing energy, for example from a fusing lamp, is then applied to the formed layer of build material. Energy is absorbed more readily where fusing agent is applied, which causes those portions of the build material on which fusing agent is applied to melt and coalesce, or fuse, and subsequently solidify when cooled, thus forming a layer of a 3D object. Such systems may additionally print a pattern of a detailing or cooling agent which may be used, for example, to improve surface detail, control other mechanical properties of a printed object, or to interact in a predetermined manner with fusing agent.

Figure 1:
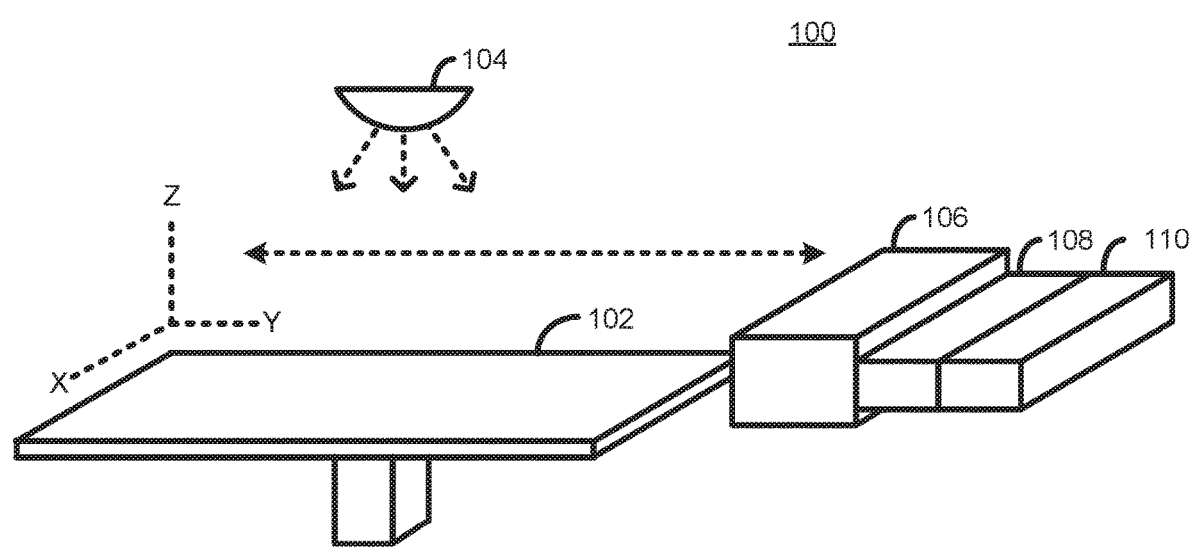
FIG. 1 is a simplified illustration of an example 3D printing system.

A simplified illustration of an example 3D printing system 100 is shown in FIG. 1. The printing system 100 comprises a build platform 102 on which a layer of build material, such as a powdered build material, is formed. The build platform 102 is moveable in the z-axis (i.e. vertically). A layer of build material may be formed by a build material distributor 106 mounted on a carriage movable in the y-axis. The build material distributor 106 may, for example, be a re-coater roller that spreads a pre-prepared pile of build material across the build platform. In another example the build material distributor 106 may spread or deposit build material from a hopper (not shown) to form a layer of build material on the build platform 102. An initial layer of build material is formed directly on the upper surface of the build platform 102, whereas subsequent layers of build material are formed on a previously formed layer of build material.

Although not shown in FIG. 1, the build platform 102 may be housed within a build unit (not shown) having a base and side walls to contain build powder and generated 3D objects during the 3D printing process One or more printable agents, such as fusing agent and detailing agent, may then be selectively printed, in independent patterns, on the latest formed layer of build material, for example from a printhead 108 also mounted on a carriage. In other examples, the printheads, fusing lamps, and recoater may be arranged in other configurations, for example on multiple carriages in the same axis, in multiple carriages in orthogonal axes, or in any other suitable configuration.

Fusing energy, such as light or infra-red radiation, may then be applied to the top layer of build material, for example from a fusing lamp 110, to cause fusing of the build material in accordance with the printed patterns of agent as described above.

Pre-heating of the formed layer of build material may reduce the amount of energy to be supplied by the fusing lamps to cause fusing. Such an arrangement may also help in improving the physical properties of 3D printed objects, for example due to improved crystallization of the build material.

After fusing, the build platform 102 is lowered by a predetermined amount, and the process is repeated until a 3D object has been generated layer-by-layer.

Such 3D printing systems are generally relatively sensitive to thermal imbalances between different portions of the formed layers of build material. Furthermore, elements of such systems, such as the fusing lamps and pre-heating lamps, may have high thermal inertia. Accordingly, the instantaneous switching on and off of such energy sources may not result in an instantaneous change in thermal conditions within the printing system. Consequently, such systems may be controlled to perform the same operations (e.g. form a layer of build material of a regular layer thickness, apply pre-heat energy, apply fusing energy, etc.) irrespective of the nature of the 3D objects being generated.

Until recently, 3D printing technology has been largely limited to producing small quantities of objects for use in prototyping environments. However, as the technology improves, so it is becoming viable to use some 3D printing systems to produce larger quantities of objects for use in production environments.

However, in order to move from prototyping environments to production environments such systems have to be efficient.

In some cases efficiency can be achieved by 3D printing multiple objects in a single print job. For example, a customer may order a batch of identical or non-identical objects to be 3D printed. The ordered objects may be batched together to make efficient use of the build volume of a 3D printer, such that a 3D print job is generated that will cause 3D printing of the batched together objects.

Typically the objects in the batch of objects will be separated from other objects in the batch by a suitable space. The space enables each 3D object to be easily separated after printing, and also helps prevent thermal bleed from one object affecting other object. The size of the space may depend on characteristics of the 3D printing system which may include: type of build material used; thermal bleed characteristics; and the use of detailing or cooling agent.

Batching of objects may be performed, for example, by a pre-processing system that receives 3D models of objects to be 3D printed and which determines a spatial arrangement of those objects within a 3D build model. In one example, the build model may be formed from multiple 3D object models, each object model representing a 3D object to be generated. It is also possible for a designer to manually batch together multiple objects in a build model.

Figure 2:
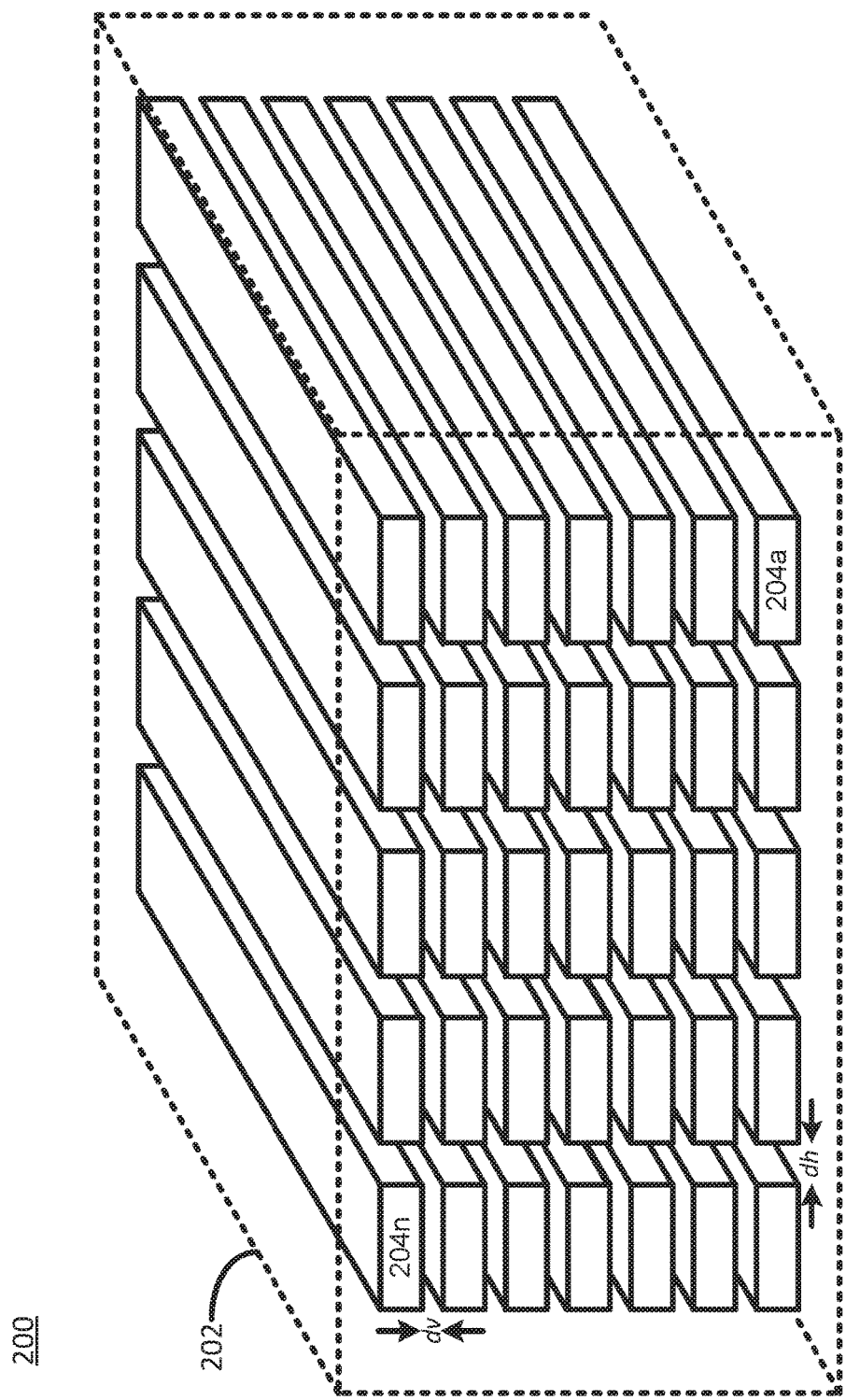
FIG. 2 is an example spatial arrangement of objects within a build model.

An example spatial arrangement 200 of objects within a build model is illustrated in FIG. 2. FIG. 2 shows the outer limits 202 of a build model. The build model may correspond to the physical build volume in which objects may be generated by a 3D printer. Within the build model 202 are arranged a number of objects 204a to 204n. In this example the objects 204 are identical to each other, although in other examples at least some of the objects may be different.

Within the build model 202 the objects 204 have been spatially arranged such that they are vertically separated from each other in the z-axis (i.e. vertical axis) by a distance dv. Each of the objects are also horizontally separated from each other by a distance dh. The separation of the objects 204a to 204n may have performed by a pre-processing system, or may have been determined by a human operator, for example using a suitable computer aided design (CAD) software application.

Figure 3:
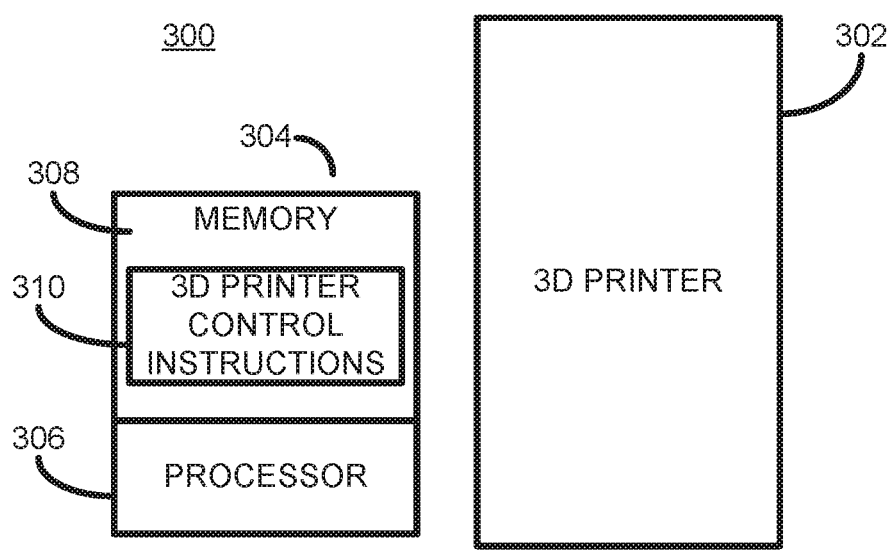
FIG. 3 is shown a block diagram of an example 3D printing system.

Referring now to FIG. 3 there is shown a simplified diagram of a 3D printing system 300 according one example. As will be described in greater detail below, the 3D printing system 300 is configured to be particularly efficient in processing 3D print jobs that comprise empty layers of unfused build material.

The 3D printing system 300 comprises a 3D printer module 302, such as a 3D printer system as described above and as shown in FIG. 1. In other examples, however, the 3D printer module 302 may be any other appropriate kind of 3D printing system, such as a selective laser sintering (SLS) 3D printer, a stereo lithography printer (SLA), or the like.

Operation of the 3D printing system 300 is controlled by a 3D printer controller 304. The controller 304 comprises a processor 306, such as a microprocessor. The processor 306 is coupled to a memory 308, for example through a suitable communications bus (not shown). The memory 308 stores processor understandable 3D printer control instructions 310 that when executed by the processor 306, cause the controller 304 to control the 3D printer as described herein. Example operation of the 3D printing system 300 will now be described with additional reference to FIGS. 4, 5, and 6.

Figure 4:
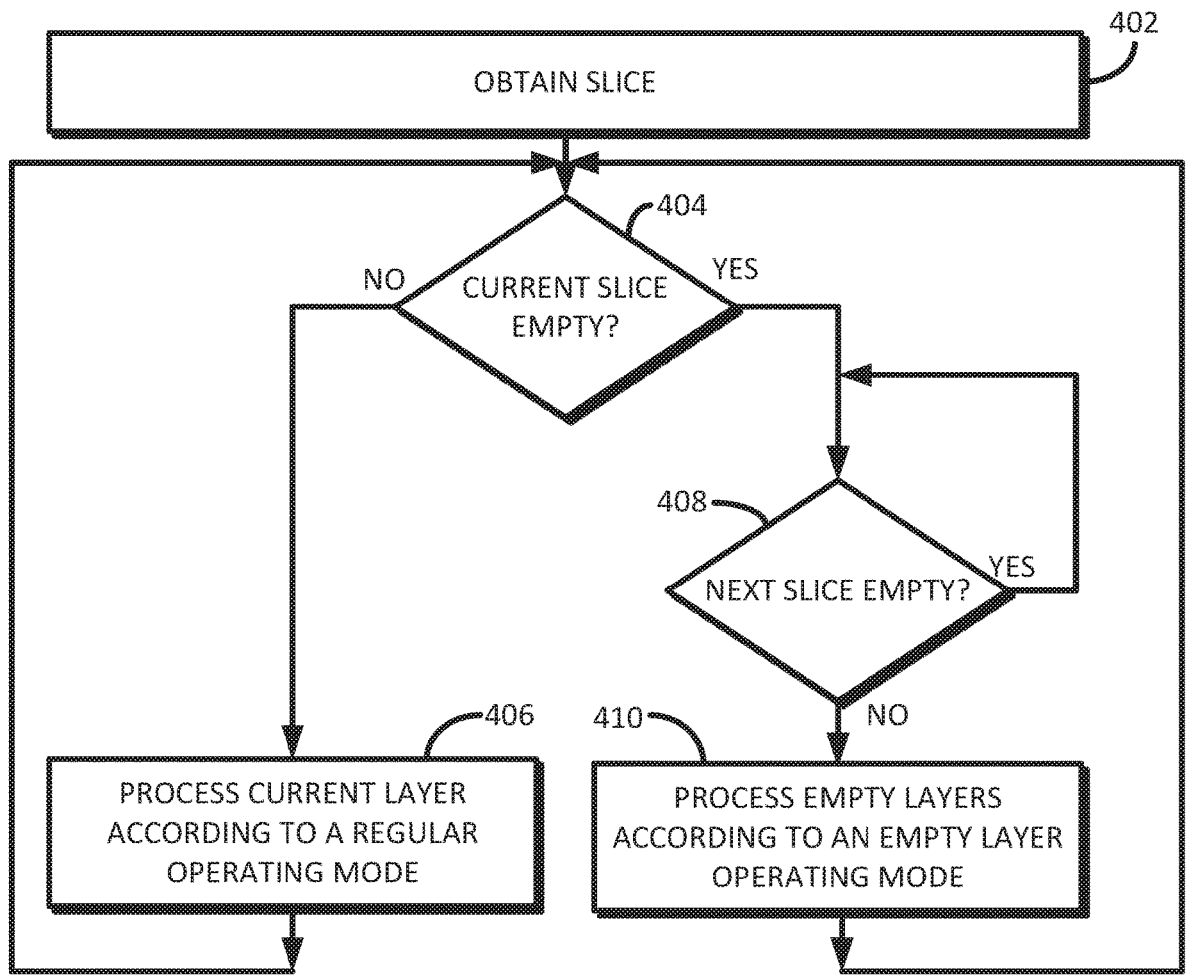
FIG. 4 is a flow diagram outlining an example method of operating a 3D printing system.
Figure 5:
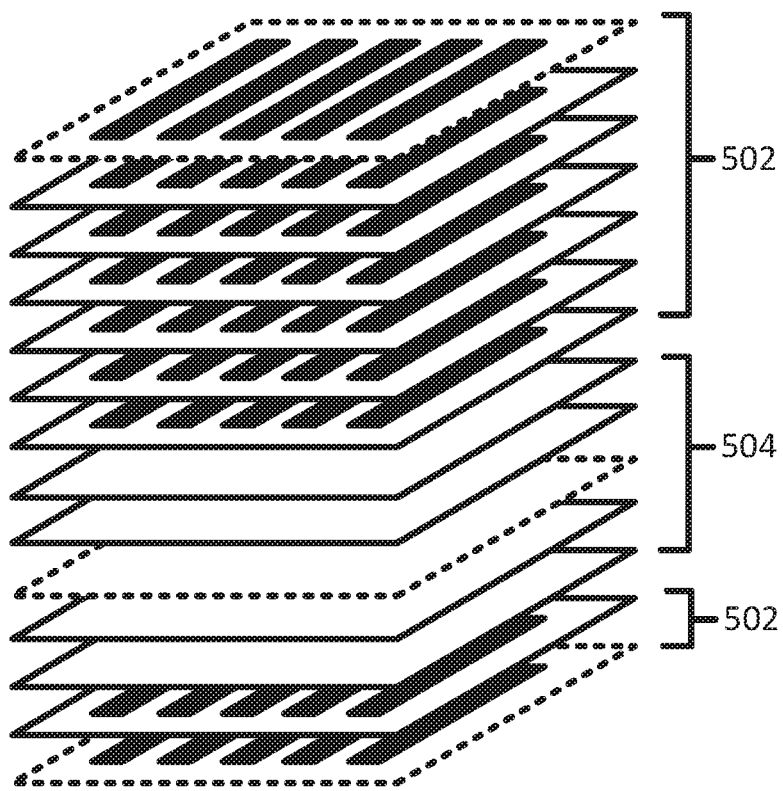
FIG. 5 is an illustration showing a set of object model slices according to one example.

Referring now to FIG. 4, at block 402 the processor 306 of the 3D printer controller 304 executes 3D printer control instructions 310 to control the processor 306 to obtain slice data of a build model. The slice data may be obtained, for example, by transforming a build model into multiple two-dimensional images, with each image representing a slice, in parallel planes, of the build model, as illustrated in FIG. 5. Each slice image represents the cross-sections (if any) of any object present in that slice. Each slice image may represent a layer of build material to be processed by the 3D printer 302.

Each slice of the build model represents a layer of build material that is to be processed by the 3D printer. Each slice, may, for example, represent, or be based on, the cross-section of any object in that slice, as illustrated in FIG. 5.

The number of slice images into which a build model is divided may depend on numerous factors. One factor is the thickness of each layer of build material that is formable by a 3D printing system. Depending on the type of 3D printing system used, the thickness of each formed layer of build material may in a range from about 50 microns to 200 microns. The thinner each layer of build material the higher the resolution of the printed 3D object. However, the number of layers of build material that need processing to generate an object may increase the time it takes to process a 3D print job.

Each slice image may be represented, for example, by a raster image having a suitable bit-depth, where the bit-depth is based on the types of properties (colour, mechanical properties, etc.) that may be produced by a 3D printing system. In one example, each slice image may have a 1-bit depth, wherein each pixel in the image may represent either a portion of a layer of build material to be solidified, or a portion of a layer of build material not to be solidified.

Each slice image is processed sequentially by the 3D printing system to generate data that is used to control the 3D printer 302 to selectively solidify portions of each formed layer of build material. For example the slice data may be converted into printhead control data to cause appropriate patterns of printing agent to be printed on a layer of build material. As can be seen in FIG. 5, a first set 502 of slices each show that portions of a layer of build material are to be selectively solidified to generate portions of 3D objects. A further set of empty slices 504, however, are devoid of any object cross-sections, and hence represent empty layers of build material on which no build material is to be solidified. In this example the set of layers 504 may represent the vertical space dv shown in FIG. 2. Depending on the thickness of each layer of build material formed by the 3D printer 302, and on the vertical space dv, the number of empty slices 504 may vary. For example, if the vertical space dv is 5 mm, and the thickness of each layer formed by the 3D printer 302 is 0.1 mm, there may be 50 empty layers 504.

At block 404 the processor 306 executes 3D printer control instructions 310 to control the processor 306 to determine whether the slice image for the current layer being processed is empty or is not empty. As previously mentioned, an empty layer represents a layer of build material devoid of any portion that is to be solidified.

If the current layer is not empty, at block 406 the processor 306 executes 3D printer control instructions 310 to control the processor 306 to process the layer in accordance with a regular operating mode. The regular operating mode may comprise a set of 'regular' processing operations that are performed whilst processing each layer of build material. For example, a regular set of processing operations may comprise, as described above:

a. vertically moving the build platform 102 by a regular layer height;
  b. preparing a corresponding volume of build material to be spread over the build platform
  c. spreading the prepared volume of build material over the build platform to form a layer of build material thereon;
  d. applying pre-heating energy to the formed layer;
  e. moving a printhead over the formed layer whilst controlling the printhead to print patterns of printing agent in accordance with slide data; and
  f. applying fusing energy to cause portions of the formed layer to fuse and solidify in accordance with the slice image.

At block 404 the process repeats.

If, however, at block 406, the processor 306 determines that the current slice image is empty, at block 408 the processor 306 determines whether the next slice image is also empty. This process repeats until the number of consecutive empty slices has been determined. In one example, the processor 306 determines whether a slice image is empty by checking in the slice image for the presence, or absence, of certain predetermined pixel values. For example, where a slice image is a binary image, the processor 306 may determine that the slice image is empty if all of the pixel of the image have a value of zero.

At block 410, the 3D printer controller 112 controls the 3D printer 100 to process the corresponding empty layers based on a second operating mode that is different from the regular operating mode. In one example, the operations performed in the second operating mode may be determined based on the determined number of empty slices.

By using different operating modes based on the presence or absence of empty layers to be processed may enable the efficiency of some 3D printing systems to be improved, which may result in faster object generation times. For example, it may be inefficient to continue performing all of the above-mentioned 'regular' processing operations when a number of consecutive empty layers are to be processed. The exact nature of the operations performed in the first and second operating mode may vary depending on type of 3D printing technology used. However, the general principles of using different processing modes based on the presence or lack of presence of empty slices may be applicable to different kinds of 3D printing technology, that may include agent and powder based 3D printing systems, selective laser sintering systems, stereo lithography printing, and direct metal sintering systems.

Figure 6:
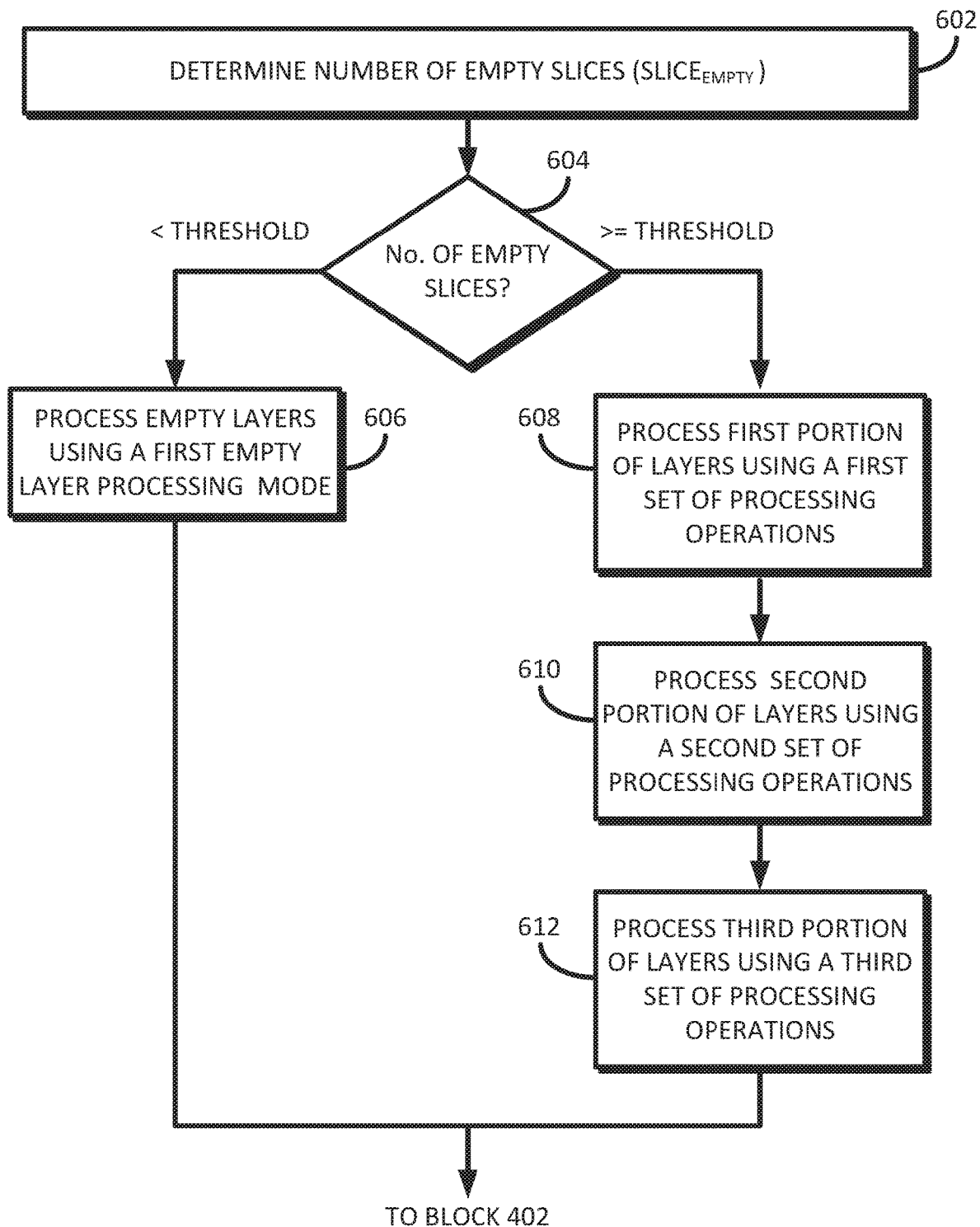
FIG. 6 is a flow diagram outlining an example method of operating a 3D printing system.

Referring now to FIG. 6, an example method of processing empty layers is shown.

At 602, the processor 306 determines the number of empty slices in the slice data. At 604, the processor 306 determines how to process the corresponding empty layers based on the number of number of empty layers. In the example shown, when the number of empty layers is less than a predetermined threshold number of empty layers, at 606 the processor 306 controls the 3D printer 302 to process all of the empty layers using a first set of processing operations. In one example the first set of processing operations may comprise all of the above-described 'regular' processing operations. When the number of empty layers is greater than or equal to a predetermined threshold number of empty layers, at 608 the processor 306 controls the 3D printer 302 to process a first portion of the empty layers using a first set of processing operations. At 610 the processor 306 controls the 3D printer 302 to process a second portion of the empty layers using a second set of processing operations. At 612 the processor 306 controls the 3D printer 302 to process a third portion of the empty layers using a third set of processing operations. In one example each portion of the empty layers is a consecutive set of empty layers.

The predetermined threshold number of layers may be chosen based, for example, on characteristics of the 3D printing system. For example, in one example a threshold of 5 layers may be chosen, or a threshold of 10 layers, or a threshold of 20 layers. In other examples a different predetermined threshold may be chosen.

A further more detailed example will now be described. The examples given below are based on a powder-based and fusing agent type 3D printing system as described above. Suitable modifications may, however, be made in other examples for use with other suitable 3D printing systems such as selective laser sintering systems.

At 606, where the number of empty layers is below the predetermined threshold the first empty layer processing mode may make some modifications to the regular layer processing operations described above. For example, the first empty layer processing mode may perform just the following layer processing operations:
  a. vertically moving the build platform 102 by a regular layer height;
  b. preparing a corresponding volume of build material to be spread over the build platform
  c. spreading the volume of build material on the build platform to form a layer of build material thereon
  d. applying pre-heating energy to the formed layer;

In this way, the 3D printing system 100 may not perform the following regular layer processing operations:
  e. moving a printhead over the formed layer whilst controlling the printhead to print patterns of printing agent in accordance with slice data; and
  f. applying fusing energy to cause portions of the formed layer to fuse and solidify in accordance with the slice image. At block 404 the process repeats.

In this mode, since no fusing energy is applied, this will result in a small amount of power saving for each empty layer processed. In some examples, the printhead may also be inactivated (i.e. not moved) for a greater duration of time than when the regular layer processing operations are performed, which may enable servicing operations to be performed on the printheads. This may also enable printhead service operations for which there is not normally time to perform whilst processing a print job to be performed during this time.

Once the empty layers have been processed, operation continues at block 402 of FIG. 4.

At 608, where the number of empty layers is greater than or equal to the predetermined threshold the first set of processing operations may be used to process a first portion of the empty layers.

In one example the first portion of the empty layers is 20% of the empty layers, the second portion of the empty layers is 80% of the empty layers, and the third portion of the empty layers is 20%. In other examples, however, these portions may be modified based on, for example, characteristics of the 3D printing system 100.

As previously mentioned, in the above-described powder and fusing agent type of 3D printing system, temperature uniformity of layers of build material is important in generating high quality 3D printed objects. As also previously mentioned, the thermal inertia of elements of the 3D printing system make it unpractical to suddenly change the way in which operations within the 3D printings system are performed. Accordingly, in this example the first set of processing operations may be considered as a mode to enable a gentle ramping down, or reduction, of the target temperature of layers of build material. The second set of processing operations may be considered as a mode to enable the rapid formation of layers of build material, and the third set of processing operations may be considered as a mode to enable a gentle ramping up, or increase, of the target temperature of layers of build material.

In a regular operating mode the build platform is moved down in uniform steps to enable each formed layer of build material to have the same thickness. This is very important in ensuring the quality and mechanical properties of generated 3D objects. However, at 610, in the second set of processing operations the distance by which the build platform is moved down may be increased to enable the empty layers to be generated faster than if generated using the first set of processing operations. For example, if in the first set of processing operations the build platform is moved down in steps of 50 microns, then the formation of 20 empty layers would lead to the twenty times the performance of the operations a), b), c) and d) described above. However, at 610 the second set of processing operations performs a different set of processing operations to more quickly generate the number of empty layers.

For example, by moving the build platform a distance greater than the regular layer thickness enables thicker layers of build material to be formed, and hence may significantly reduce the time taken to form the required number of layers. For example, if the build platform is moved a distance of 100 microns, a reduced number of thicker layers of build material may be formed that, when complete, provide an equivalent thickness of build material as the regular processing of the empty layers. If the build platform is moved a greater distance, even greater reductions in time may be achieved. Accordingly, at 610 the second set of processing operations may comprise the following operations:
 a. determine combined thickness of the second portion of empty layers
 b. vertically move the build platform 102 by an amount greater than the regular layer thickness
 c. preparing a corresponding volume of build material to be spread over the build platform
 d. spreading the volume of build material on the build platform to form a layer of build material thereon Other operations described above may not be part of the second set of processing operations. In other examples, the first, second, and third set of processing operations may cause the build material distributor and movable build platform to form layers of build material thicker than those formed when processing non-empty layers.

If the build platform 102 is moved by an amount greater than the regular layer thickness the volume of build material that is prepared to be spread over the build platform will also have to be increased by a corresponding amount. For example, forming a layer 100 microns thick will require twice as much build material as a layer 50 microns thick At 612, the third set of processing operations may be used to process a third portion of the empty layers. At the end of the operations performed by third set of processing operations the characteristics of the processed empty layers should be identical, or at least very close, to the characteristics had the regular processing mode have been used. For example, the temperature and temperature uniformity of the last empty layer should not unduly deviate from an expected temperature and an expected temperature uniformity.

In this way, at 612 the third set of processing operations may comprise the same processing operations as the first set of processing operations described above.

Figure 7:
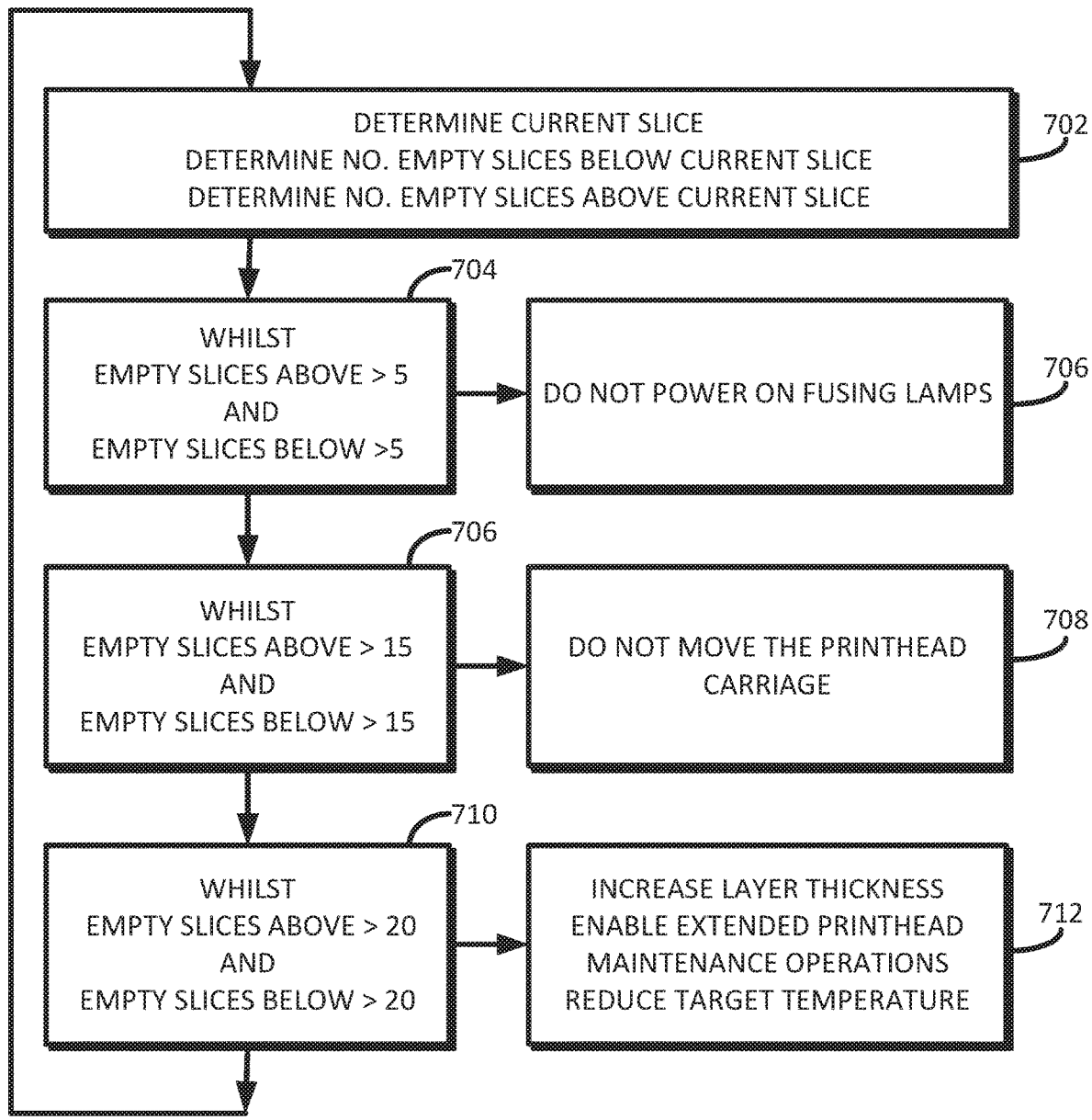
FIG. 7 is a flow diagram outlining an example method of operating a 3D printing system.

Referring now to FIG. 7, there is shown a flow diagram depicting an further example method of operating a 3D printing system based on principles described above.

At block 702 the processor 306 determines the current number, or index, of the current slice being processed by the 3D printer 302. The processor 306 determines the number of empty slices above the current slice as well as the number of empty slices above the current slice. Based on the number of empty slices above and below the current slice being processed modifications may be made to the above-described regular processing operations.

For example, at 704, whilst there are more than five empty slices above and below the current slice, at 706 the processor 306 modifies the regular processing operations to not power on the fusing lamps.

For example, at 706, whilst there are more than fifteen empty slices above and below the current slice, at 708 the processor 306 additionally modifies the regular processing operations to not move the printhead carriage.

For example, at 710, whilst there are more than 20 empty slices above and below the current slice, at 712 the processor 306 additionally modifies the regular processing operations to increase the thickness of each layer formed, to enable extended printhead maintenance operations to be performed on the printheads, and to reduce the target temperature of the formed layers of build material by a predetermined amount.

It will understood that the methods described in relation to FIGS. 6 and 7 are example implementations of the method described in relation to FIG. 4. It will be further understood that further example methods may also be envisaged.

Although the above-described examples refer to a 3D printing system that uses a fusing agent and fusing energy, any 3D printing technique that processes successive layers of a build material may be used. Another 3D printing technology that selectively solidifies portions of layers of a build material is selective laser sintering (SLS).

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A three-dimensional printing system comprising: a 3D printer having a printhead carriage and a fusing lamp; and a controller configured to: obtain data relating to slices of a build model for multiple object models each representing an object to be formed by the 3D printer, the build model including non-empty slices and empty slices; determine a first number of consecutive empty slices in the build model exceeds a first threshold of five or more; and cause the 3D printer to: form a non-empty layer corresponding to a non-empty slice in the build model according to a first operating mode that includes moving the printhead carriage and powering on the fusing lamp; and form a second number of empty layers corresponding to the first number of consecutive empty slices in the build model according to a second operating mode that includes one or both of not moving the printhead carriage and not powering on the fusing lamp.

2. The printing system of claim 1, wherein the second number is the same as the first number.

3. The printing system of claim 1, wherein: the second number is less than the first number; and each of the second number of empty layers is thicker than each of the first number of empty slices.

4. The printing system of claim 1, wherein the controller is configured to: determine the first number of consecutive empty slices in the build model exceeds a second threshold greater than the first threshold; and in response to determining the first number of consecutive empty slices exceeds the second threshold, form the second number of empty layers according to a second operating mode that includes not moving the printhead carriage and not powering on the fusing lamp.

5. The printing system of claim 4, wherein the controller is configured to: determine the first number of consecutive empty slices in the build model exceeds a third threshold greater than the second threshold; and in response to determining the first number of consecutive empty slices exceeds the third threshold, form the second number of empty layers according to a second operating mode in which each of the second number of empty layers is thicker than each of the first number of empty slices.

6. A method for a three-dimensional printing system, comprising: obtaining data relating to slices of a build model for multiple object models each representing an object to be formed by the three-dimensional printing system; determining a first number of consecutive empty slices in the build model exceeds a first threshold of five or more; forming a non-empty layer corresponding to a non-empty slice in the build model according to a first operating mode that includes moving a printhead carriage and powering on a fusing lamp; and forming a second number of empty layers corresponding to the first number of consecutive empty slices in the build model according to a second operating mode that includes one or both of not moving the printhead carriage and not powering on the fusing lamp.

7. The method of claim 6, wherein: the second number is less than the first number; and each of the second number of empty layers is thicker than each of the first number of empty slices.

8. The method of claim 6, comprising: determining the first number of consecutive empty slices in the build model exceeds a second threshold greater than the first threshold; and in response to determining the first number of consecutive empty slices exceeds the second threshold, forming the second number of empty layers according to a second operating mode includes not moving the printhead carriage and not powering on the fusing lamp.

9. The method of claim 8, comprising: determining the first number of consecutive empty slices in the build model exceeds a third threshold greater than the second threshold; and in response to determining the first number of consecutive empty slices exceeds the third threshold, forming the second number of empty layers according to a second operating mode in which each of the second number of empty layers is thicker than each of the first number of empty slices.

* * * * *